United States Patent [19]
Fujimoto

[11] Patent Number: 5,134,721
[45] Date of Patent: Jul. 28, 1992

[54] NOISE ELIMINATING DEVICE FOR ANGLE-MODULATED WAVE

[75] Inventor: Atsushi Fujimoto, Hino, Japan

[73] Assignee: Iwatsu Electric Co., Ltd., Tokyo, Japan

[21] Appl. No.: 549,362

[22] Filed: Jul. 6, 1990

[30] Foreign Application Priority Data

Jul. 19, 1989 [JP] Japan .................................. 1-184727

[51] Int. Cl.⁵ .............................................. H04B 1/10
[52] U.S. Cl. .................................. 455/235.1; 455/303
[58] Field of Search .............................. 455/302–308, 455/295, 296, 234, 235; 375/102

[56] References Cited

U.S. PATENT DOCUMENTS

| | | | |
|---|---|---|---|
| 3,949,309 | 4/1976 | Pecar | 455/305 |
| 4,181,892 | 1/1979 | Dilley | 455/306 |
| 4,408,352 | 10/1983 | Dudding | 455/305 |
| 4,739,518 | 4/1988 | Bickley et al. | 455/305 |
| 4,878,251 | 10/1989 | Richardson | 455/302 |

*Primary Examiner*—Curtis Kuntz
*Attorney, Agent, or Firm*—Emmanuel J. Lobato; Robert E. Burns

[57] ABSTRACT

There is disclosed a noise eliminating device for an angle-modulated wave, in which a carrier amplitude fluctuation of an angle-modulated input wave is detected in a frequency difference detector to obtain a frequency variation signal corresponding to a frequency variation arising at an amplitude limiter from the carrier amplitude fluctuation. Noise caused by the amplitude fluctuation is eliminated from the angle-modulated input wave by subtracting the frequency variation signal from an output signal of the amplitude limiter after or before the frequency difference detector.

11 Claims, 10 Drawing Sheets

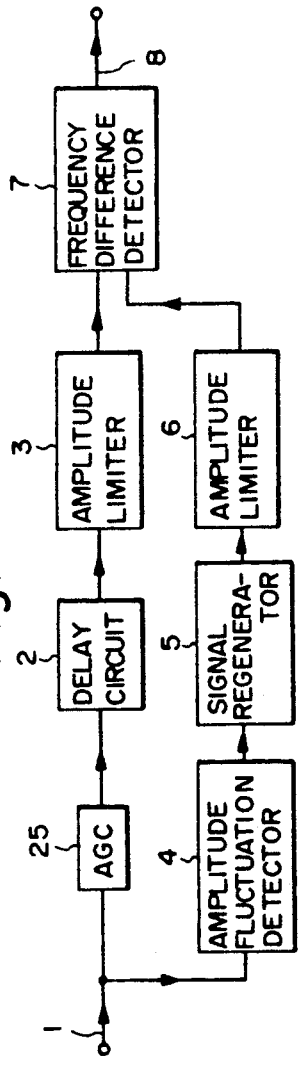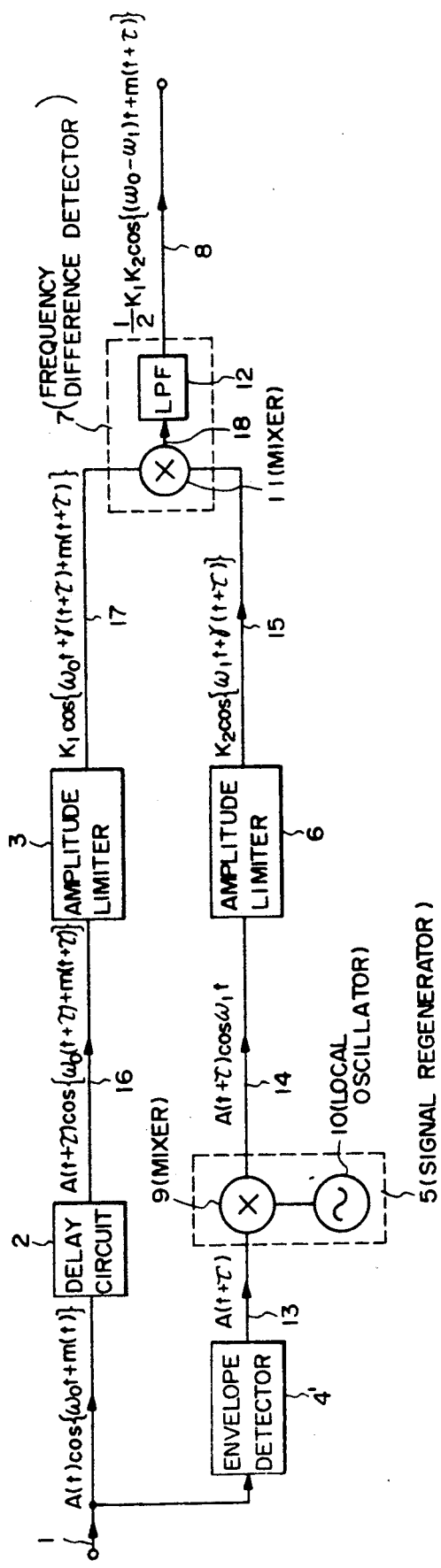

NOISE ELIMINATING DEVICE FOR ANGLE-MODULATED WAVE

BACKGROUND OF THE INVENTION

The present invention relates to a noise eliminating device by which, in the case of transmitting an angle-modulated wave mainly in radio communications, noise arising from a carrier amplitude variation under the influence of a transmission medium is removed to thereby provide for enchanced transmission quality.

Prior Art

A frequency discriminator is usually employed for demodulating angle-modulated wave, but the angle-modulated wave has a carrier amplitude variation under the influence of the transmission medium and the characteristic of IF filter of the receiving device. Accordingly, when the received wave is demodulated intact by the frequency discriminator, there appear noise components in the demodulated signal due to the carrier amplitude variation of the received angle-modulated wave, resulting in the signal-to-noise ratio (i.e SN ratio) of the demodulated output being degraded. To avoid this, it is customary in the prior art to suppress the influence of the carrier amplitude variation by applying the received angle-modulated wave to an amplitude limiter prior to supplying it to the frequency discriminator. In general, however, an amplitude limiter converts the carrier amplitude variation to a phase variation; so that when the angle-modulated wave having the carrier amplitude variation is applied to the amplitude limiter, the phase variation resulting from the amplitude variation is superimposed on the phase variation caused by the angle modulation. On this account, FM noise due to the amplitude variation is superimposed on the demodulated output, also leading to the deterioration of the SN ratio.

SUMMARY OF THE INVENTION

An object of the present invention is to provide a noise eliminating device which permits demodulation of an angle-modulated input wave which is essentially free from the influence of an amplitude variation of its carrier.

To attain the above objective, the noise eliminating device according to a first invention of this application is provided with: a first amplitude limiter whereby an angle-modulated input wave whose carrier emplitude varies under the influence of the transmission medium or the like is limited to a certain amplitude; an amplitude variation detector which provides a signal corresponding to the amplitude variation of the carrier of the input wave; a signal regenerator whereby a signal having substantially the same carrier amplitude variation as that of the input wave is regenerated from the output signal of the amplitude variation detector; a second amplitude limiter for limiting the output signal from the signal regenerator to a certain amplitude; and a frequency difference detector which receives the output signals of the first amplitude limiter and the second amplitude limiter directly or via a frequency discriminator or the like and yields a signal corresponding to the frequency difference between the both output signals.

The noise eliminating device according to a second invention of this application is provided with: an amplitude limiter for limiting the amplitude of the input wave to a certain amplitude; a frequency discriminator for detecting a frequency variation of the output signal from the amplitude limiter; an amplitude variation detector for producing a signal corresponding to an amplitude variation of the carrier of the input wave; and a signal processor which has information about an input wave power vs. relative delay time difference characteristic of the amplitude limiter and receives the output signals of the frequency discriminator and the amplitude variation detector and whereby a frequency variation caused by the amplitude variation of the carrier is removed from the detected frequency variation.

The noise eliminating device according to a third invention of this application is provided with: a mean power AGC circuit for making the mean power of the input wave substantially constant; an amplitude limiter for limiting the amplitude of the output signal of the mean power AGC circuit to a certain amplitude; an amplitude variation detector which receives the input wave or the output signal of the mean power AGC circuit and yields a signal corresponding to its amplitude variation; an inverter for inverting the sign of the output signal of the amplitude variation detector; a signal regenerator which receives the output signal of the inverter and produces a signal which has substantially the same mean power as the output signal of the AGC circuit and has amplitude variation reverse to that of the input wave; and a frequency sum detector which receives the output signals of the first and second amplitude limiters directly or via a frequency discriminator and yields a signal corresponding to the sum of their frequencies.

The noise eliminating device of the present invention removes the FM noise generated at any amplitude limiter due to AM-FM transformation in a case where the carrier amplitude of the input wave of the limiter varies through time.

BRIEF DESCRIPTION OF THE DRAWINGS

The present invention will be described in detail below in comparison with prior art with reference to the accompanying drawings, in which:

FIGS. 1B, 1C, 1D and 1E are block diagram showing modified forms of the embodiment depicted in FIG. 1A;

FIG. 1F is a block diagram explanatory of the principle of the present invention;

DETAILED DESCRIPTION

To make difference between prior art and the present invention clear, prior art will first be described.

Figure 7:
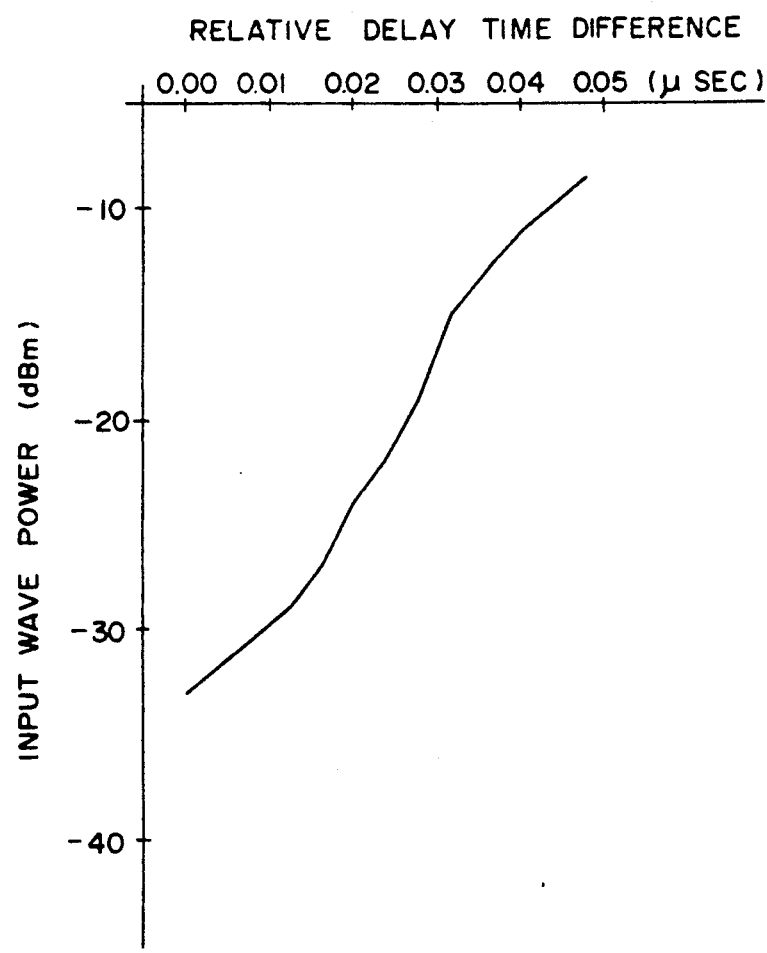
FIG. 7 is a graph showing the input signal power vs. relative delay time difference characteristic of an amplitude limiter.
Figure 8:
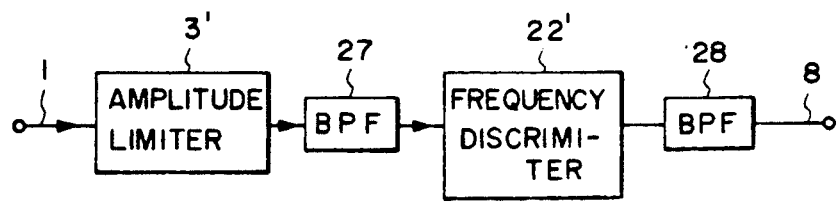
FIG. 8 is a block diagram showing an example of a conventional device for eliminating noise caused by a relative delay time difference shown in FIG. 7.

In FIG. 7 there is shown an example of the relationship between the relative delay time difference of a signal and an input wave power in the amplitude limiter. As the input wave level due to the carrier amplitude variation varies, the delay time through the amplitude limiter varies, and this variation is demodulated by the frequency discriminator, increasing noise. For removing this noise originating in the amplitude variation it is a general practice in the prior art to employ an arrangement in which the noise is separated from the demodulated signal by means of a filter. FIG. 8 shows an example of such a conventional arrangement. In FIG. 8 reference numeral 27 indicates a narrow band-pass filter and 28 a band-pass filter whose pass band is substantially the same as the band of the demodulated base band signal.

Figure 5A:
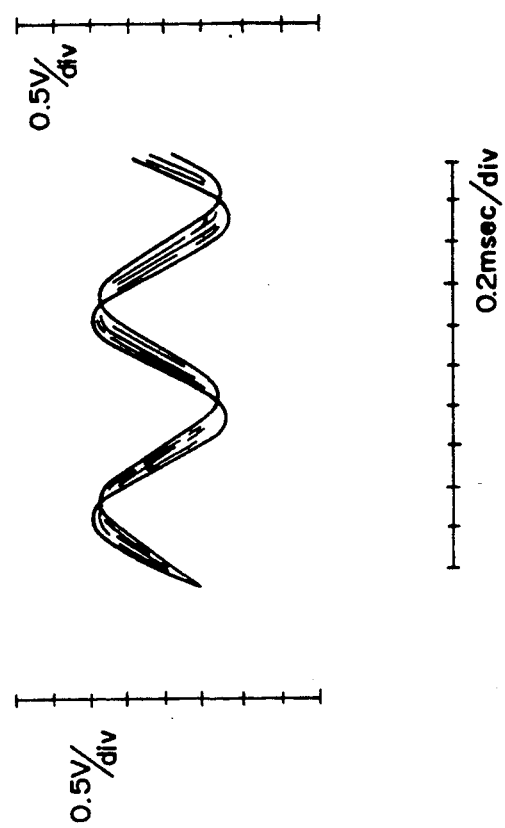
Figure 5C:
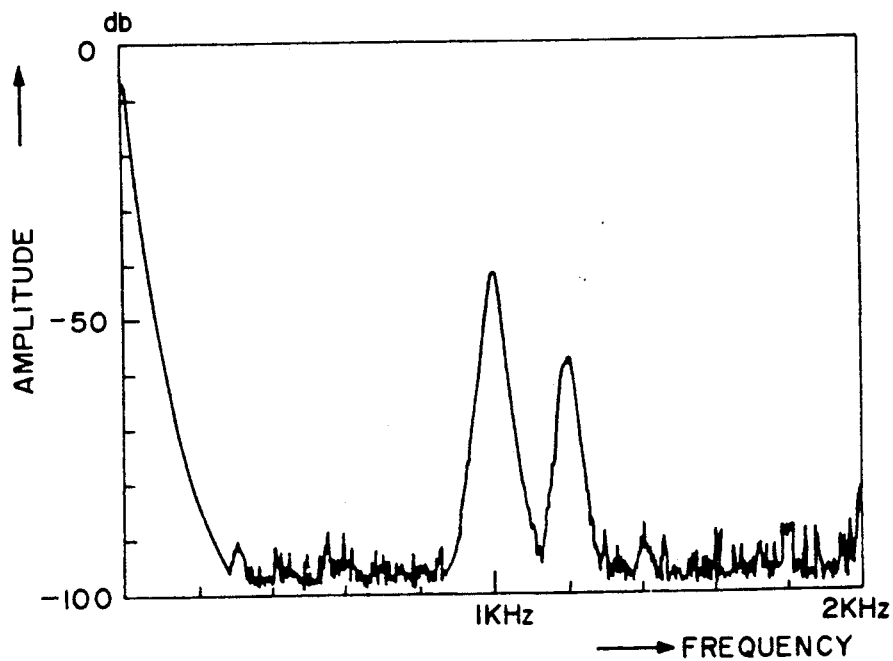
FIGS. 5C, 5D and FIGS. 6A, 6B are diagrams showing examples of signal spectra obtained in a cases where the present invention is employed and the where the invention is not used.
Figure 6A:
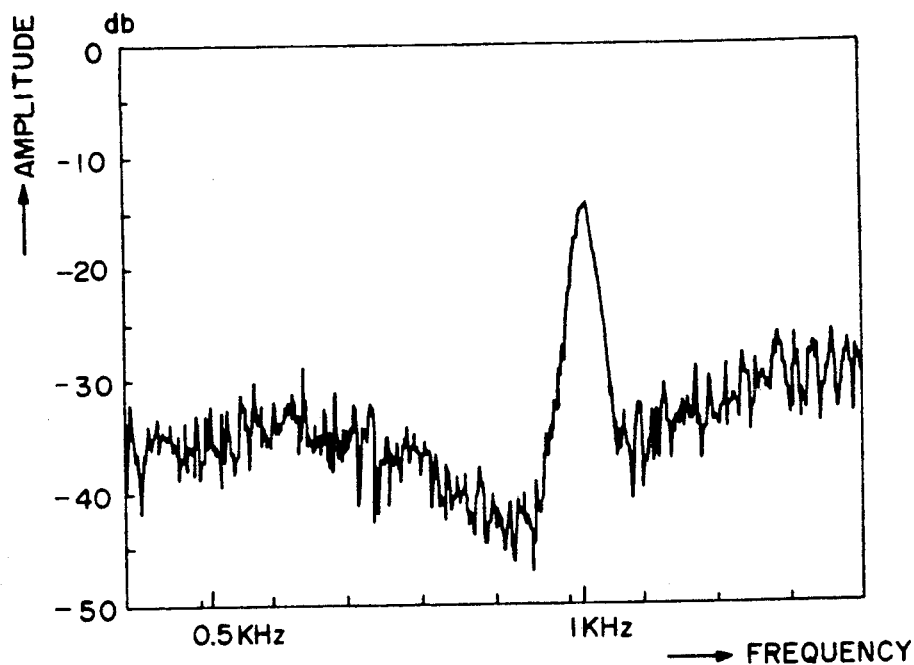

As described above, since the signal delay time through the amplitude limiter depends on the input wave power, the carrier amplitude variation of the input wave is converted to a phase variation through the amplitude limiter and is superimposed as noise on the demodulated signal. Since the noise in the demodulated signal caused by the carrier amplitude variation may sometimes have a frequency component identical with or close to the frequency component signal to be transmitted, there are cases where the noise cannot be separated by the filter at the demodulated signal, introducing trouble in communication. FIGS. 5A and 5C respectively show a demodulated signal and its spectrum obtained by detecting, with a conventional FM radio, a signal frequency modulated (a modulation index 1) by a 1 kHz sine wave and amplitude modulated (a modulation factor 47%) by a 1.2 kHz sine wave (the waveform of the modulated wave obtained on a synchroscope being shown in FIG. 4). It is seen that the AM wave is demodulated and mixed as noise. FIG. 6A shows the spectrum of a demodulated signal of an signal frequency-modulated by a 1 kHz sine wave and amplitude-modulated by pseudo random variations obtained by applying to a low-pass filter (fc=2 kHz) a pseudo random pulse signal generated at a clock signal rate of 900 bits/sec. The noise power has increased 10 to 20 dB owing to the presence of the amplitude variation, but this noise is distributed in the same frequency band as the signal in the demodulated signal, and hence cannot be removed by a filter or similar means.

In communications for high-speed mobile members using quasi-microwave band, in particular, the noise spectrum is distributed over so wide a band that the noise cannot be removed by a filter or like means. Hence, the removal of this noise is a problem which is urgently demanded to solve.

Next, embodiments of the present invention will be described with reference to the accompanying drawings.

First Embodiment

Figure 1A:
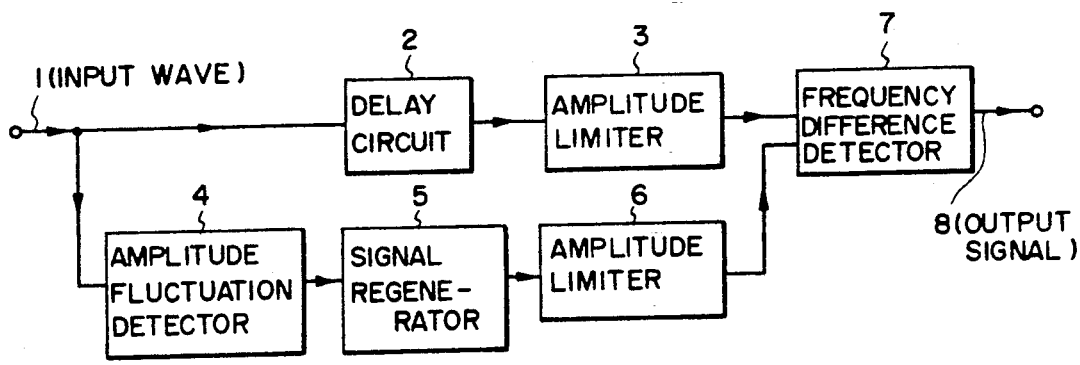
FIG. 1A is a block diagram illustrating a first embodiment of the present invention.

FIG. 1A is a block diagram illustrating a first embodiment of the present invention. In FIG. 1A an input wave 1 is split into two, one of which is applied via a delay circuit 2 to a first amplitude limiter 3 and the other of which is applied to an amplitude variation detector 4 (an envelope detector, for example), which detects a carrier amplitude variation of the input wave 1 and provides the corresponding signal. The output signal of the amplitude variation detector 4 is provided to a signal regenerator 5 which outputs a signal which has substantially the same carrier amplitude variation as that of the input signal 1. The output signal of the signal regenerator 5 hardly contains information about the frequency variation of the angle-modulated input signal 1. The output signal of the signal regenerator 5 is provided to a second amplitude limiter 6 which has substantially the same input wave power vs. relative delay time difference characteristic as that of the first amplitude limiter 3. The first amplitude limiter and the second amplitude limiter which have substantially the same characteristics on temperature or other are available by using IC limiters on the same chip. The output signal of the first amplitude limiter 3 whose amplitude is substantially constant has, in its frequency, information about the frequency variation caused by the carrier amplitude variation as well as information about the frequency variation of the input wave 1. On the other hand, the output signal of the second amplitude limiter 6 whose amplitude is almost constant has, in its frequency, only information about the frequency variation resulting from the carrier amplitude variation. A frequency difference detector 7 detects the frequency difference between the output signal of the first amplitude limiter 3 and the second amplitude limiters 6 before or after frequency detection, by which it is possible to demodulate the angle-modulated input wave with practically no influence of the carrier amplitude variation of the input wave.

For a specific operative example of the amplitude variation detector, an envelope detector, a square-law detector, or the like may be used. The signal regenerator 5, may be composed of a local oscillator and a multiplier. The frequency difference detector 7 may be composed of a multiplier and a low-pass filter or band-pass filter disposed immediately after a multiplier.

FIG. 1F shows a specific operative example of the construction of the noise eliminating device.

Next, the principle of operation of the present invention will be described with reference to FIG. 1F and by the aid of mathematical expressions. The input wave 1 having a carrier amplitude variation is expressed by the following expression:

$$s_1(t) = A(t) \cos \{\omega_0 t + m(t)\} \quad (1)$$

Supplied with the input wave 1, the envelope detector 4 provides a signal 13, which is given by the following expression:

$$s_{13}(t) = A(t+\tau) \quad (2)$$

where $\tau$ is a delay time which is consumed for detection. A mixer 9 is supplied with the signal 13 and a sine wave from a local oscillator 10 and yields a signal 14, which is expressed by the following expression:

$$s_{14}(t) = A(t+\tau) \cos \omega_1 t \quad (3)$$

where $\omega_1$ is the angular frequency of the sine wave from the local oscillator 10. The signal 14 is applied to the second amplitude limiter 6. The output signal 15 from the second amplitude limiter 6 is expressed by the following expression:

$$s_{15}(t) = K_2 \cos \{\omega_1 t + \gamma(t+\tau)\} \quad (4)$$

where $K_2$ is the saturation level of the second amplitude limiter 6 and $\gamma(t)$ is a phase variation which is determined by $A(t+\tau)$ and the delay characteristic (a dependence of the delay time through a limiter to the carrier amplitude of an input signal) of the second amplitude limiter 6. On the other hand, a signal 16 provided from the delay circuit 2 is given by the following expression:

$$s_{16}(t) = A(t+\tau') \cos\{\omega_0(t+\tau') + m(t+\tau')\} \quad (5)$$

where $\tau'$ is the delay time through the delay circuit 2. Receiving the signal 16, the first amplitude limiter 6 provides a signal 17, which is expressed as the following expression:

$$s_{17}(t) = K_1 \cos\{\omega_0 t + \gamma(t+\tau') + m(t+\tau')\} \quad (6)$$

where $K_1$ is the saturation amplitude of the first amplitude limiter 3. It is assumed here that the delay characteristic of the first amplitude limiter 3 at the angular frequency $\omega_0$ is substantially the same as the delay characteristic of the second amplitude limiter 12 at the angular frequency $\omega_1$. Then, the output signal 18 of a mixer 11 is given by the following expression:

$$s_{18}(t) = 1/2 K_1 K_2 \cos\{(\omega_0 - \omega_1)t + \gamma(t+\tau') - \gamma(t+\tau) + \quad (7)$$

$$m(t+\tau')\} + 1/2 K_1 K_2 \cos\{(\omega_0 + \omega_1)t + \gamma(t+\tau') + \gamma(t+\tau) +$$

$$m(t+\tau')\}$$

In a case where $\tau = \tau'$, the output signal 8 of a LPF 12 is expressed as the following formula.

$$s_8(t) = 1/2 K_1 K_2 \cos\{(\omega_0 - \omega_1)t + m(t+\tau')\} \quad (8)$$

The signal 8 is the demodulated signal of the angle-modulated wave excluding the influence of the carrier amplitude variation of the input wave 1.

Modified Forms of First Embodiment (1) The arrangement of FIG. 1A includes the delay circuit 2 for compensating for a delay in the amplitude variation detector 4 and so on, but when the influence of such a delay is slight, the delay circuit 2 may be omitted.

(2) In the arrangement of FIG. 1A the frequency difference detector 8 may also be replaced by a phase difference detector.

Figure 1B:
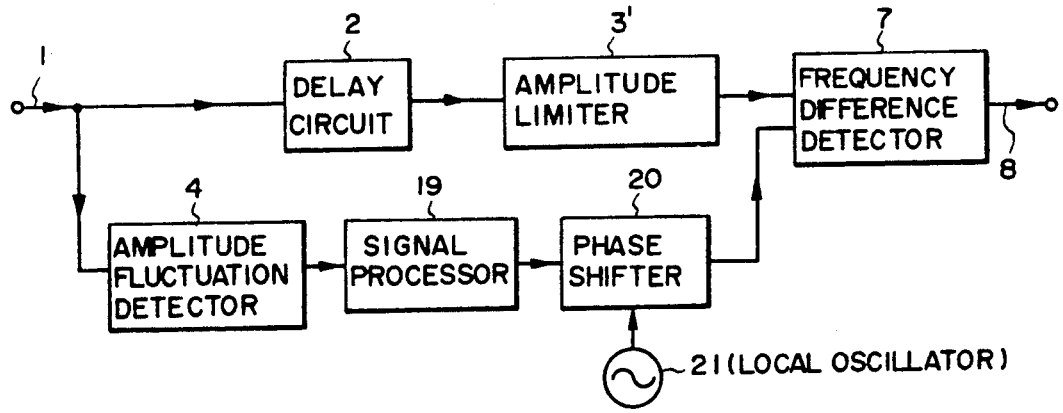

(3) In the arrangement of FIG. 1A the second amplitude limiter 6 is used to convert the carrier amplitude variation to the phase variation, but the same operation could also be obtained by controlling a phase shifter with the output signal of the amplitude variation detector 4. FIG. 1B shows an example of such an arrangement.

(4) An envelope detector, square-law detector, or the like can be used as the amplitude fluctuation detector 4, but the carrier amplitude fluctuation itself need not always be detected, if a signal having about the same carrier amplitude fluctuation as that of the input wave can be regenerated by the connection of the amplitude fluctuation detector 4 and the signal regenerator 5.

Figure 1C:
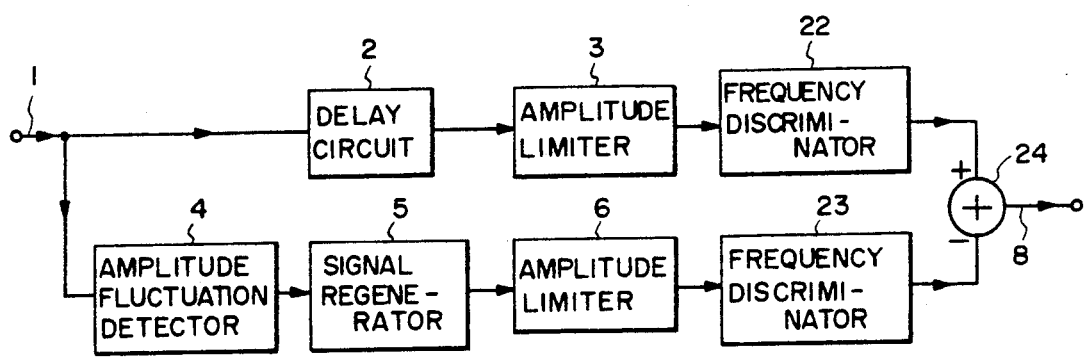

(5) FIG. 1C shows an arrangement in which frequency discriminators are disposed immediately after the first amplitude limiter and the second amplitude limiter, respectively, so as to detect the difference between output signals of the two frequency discriminators. This arrangement also permits the removal of noise.

Figure 1D:
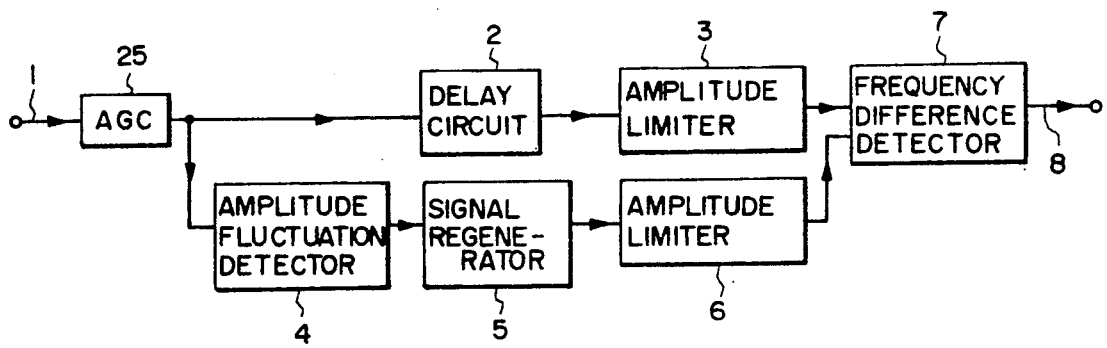

(6) In a case where an amplitude fluctuation of the input wave to the amplitude limiter is not so great that the relative delay time difference in each amplitude limiter is proportional to the input wave power, the input signals to the first amplitude limiter 3 and the second amplitude limiter 6 need not always be exactly equal in power to each other. In general, however, it is preferable that they be nearly equal to each other. In the embodiment depicted in FIG. 1A, the variation of the carrier amplitude of the input wave is detected by the amplitude variation detector 4 only with the mean amplitude of the input wave and is supplied to the signal regenerator 5. FIGS. 1D and 1E show embodiments which employ an AGC circuit for the purpose of making the mean carrier amplitude of the input signals to the first amplitude limiter and the second amplitude limiter substantially equal to each other. It is possible to change the order of the AGC circuit and the delay circuit in FIG. 1E.

It will be self-evident that the respective component circuits can be replaced by circuits which have the same functions as theirs.

Second Embodiment

Figure 2:
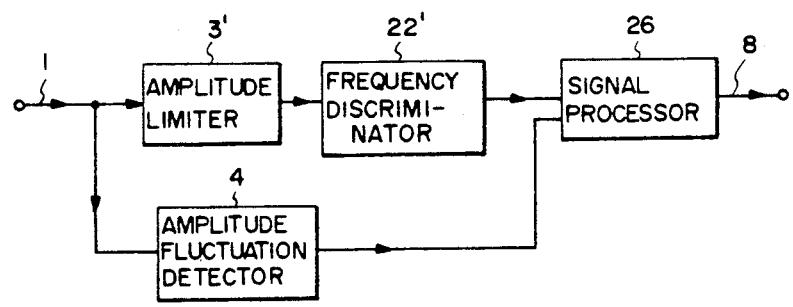
FIG. 2 is a block diagram illustrating a second embodiment of the present invention.

FIG. 2 is a block diagram illustrating a second embodiment of the present invention. In FIG. 2 the input wave 1 is branched into two, one of which is applied to an amplitude limiter 3' and the other of which is applied to the amplitude variation detector 4. The output signal of the amplitude limiter 3' is provided to a frequency discriminator 22', wherein a frequency variation is detected. However, the frequency variation detected here includes a frequency variation by the carrier amplitude variation produced in the amplitude limiter 3' and superimposed on the frequency variation of the angle-modulated input wave. On the other hand, the output signal of the amplitude fluctuation detector 4 is supplied to a signal processor 26. Since the signal processor 26 has information about the input wave power vs. relative delay time difference characteristic of the amplitude limiter 3', the frequency variation generated due to the carrier amplitude variation in the amplitude limiter 3' is obtained from the output signal of the amplitude variation detector 4. Since the signal processor 26 outputs the difference between the output signal of the frequency discriminator 22' and the signal proportional to the frequency variation resulting from the above-mentioned amplitude variation synthesized from the output signal of the amplitude variation detector 4, the use of the output signal 8 from the signal processor 26 permits the demodulation of the angle-modulated input wave which is almost free from the influence of the carrier amplitude variation of the input wave.

Third Embodiment

Figure 3A:
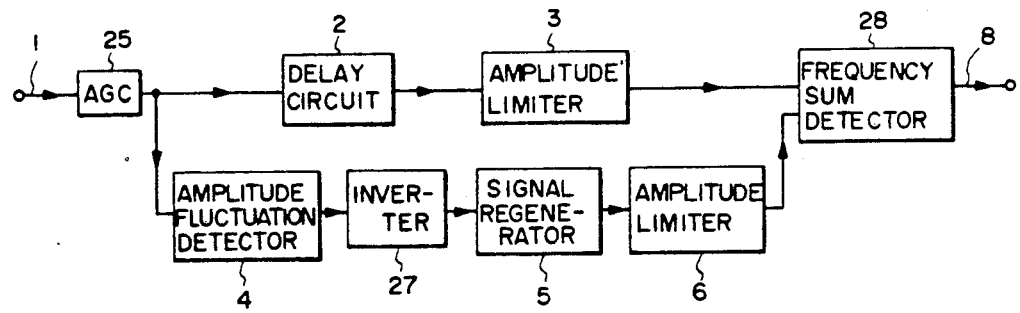
FIG. 3A is a block diagram illustrating a third embodiment of the present invention.

FIG. 3A is a block diagram illustrating a third embodiment of the present invention. In FIG. 3A the input wave is applied to a mean power AGC circuit 25 for the purpose of making its mean power substantially constant. The output signal from the mean power AGC circuit 25 is branched into two, one of which is provided via the delay circuit 2 to the first amplitude limiter 3 and the other of which is provided to the amplitude variation detector 4. The amplitude variation detector 4 yields a signal corresponding to an amplitude variation of the carrier of the output signal from the mean power AGC circuit 25, and this output signal of the detector 4 is inverted by an inverter 27. The signal regenerator 5 receives the output signal of the inverter 27 and generates and outputs a signal which has substantially the same mean power as that of the output signal of the mean power AGC circuit 25 and has substantially the same carrier amplitude as that of the output signal of the inverter 27. The output signal of the signal regenerator 5 is provided to the second amplitude limiter 6 which has substantially the same input wave power vs. relative delay time difference characteristic as does the first amplitude limiter 3. The output signal of the first amplitude limiter 3 is substantially constant in the carrier amplitude and its frequency variation consists of the frequency variation of the input wave 1 and a frequency variation caused in the first amplitude limiter 3 owing to the carrier amplitude variation. In a case where the relative delay time in each amplitude limiter is proportional to the input wave power and its proportional constant is substantially the same in both of the first amplitude limiter 3 and the second amplitude limiter 6, the frequency variation occurring in the output signal of the second amplitude limiter 6 is equal in amplitude to but reverse in sign from the frequency variation caused in the first amplitude limiter 3 due to the carrier amplitude variation. Thus, by obtaining the frequency sum of the output signals from the first amplitude limiter 3 and the second amplitude limiter 6 in the RF or IF region through use of a frequency sum detector 28, the angle-modulated input wave can be demodulated with practically no influence of the carrier amplitude variation of the input wave. Next, a difference between the third embodiment and the first and second embodiments will be described with reference to FIG. 3A and by the aid of mathematic expressions. Letting the amplitude of the input signal rendered substantially constant by the mean power AGC circuit 25 be represented by $A_0$, the amplitude of the output signal from the AGC circuit 25 varies about $A_0$. Letting this variation be represented by f(t), the amplitude variation $B_1(t)$ of the output signal from the mean power AGC circuit 25 is given by the following expression:

$$B_1(t) = A_0 + g(t) \quad (9)$$

It is assumed that the first amplitude limiter 3 and the second amplitude limiter 6 have substantially the same input wave power vs. relative delay time difference characteristic, and this characteristic is expressed as follows:

$$D = \sum_{k=1}^{\infty} d_k (B - A_0)^k \quad (10)$$

where D is the relative delay time difference in each amplitude limiter, B is the carrier amplitude of the input wave to the amplitude limiter, and $d_k$ is a constant representing the characteristic of the amplitude limiter, but $d_0$ represents the delay time in the amplitude limiter when the amplitude of the input wave to the amplitude limiter is $A_0$.

Let it be assumed that use is made of an amplitude limiter in which $d_k$ (k≧2) is sufficiently small and the following expression approximately holds for the entire variation range of the carrier amplitude B.

$$D = d_0 + d_1(B - A_0) \quad (11)$$

Letting a phase variation due to the delay D be represented by $\phi$, it is expressed as follows:

$$\phi = 2\pi f D \quad (12)$$

where f is the center frequency of the input wave to the amplitude limiter.

On the other hand, a frequency variation $\gamma$ due to the phase variation $\phi$ is expressed as follows:

$$\gamma = \frac{1}{2\pi} \cdot \frac{d\phi}{dt} \quad (13)$$

From Expressions (9) to (13) the frequency variation $\phi_1(t)$ which occurs in the output signal of the first amplitude limiter 3 owing to the carrier amplitude variation is given by the following expression:

$$\phi_1(t) = f \cdot \frac{dg(t + \tau)}{dt} \quad (14)$$

where $\tau$ is the delay time of the delay circuit 2.

Further, the carrier amplitude variation of the output signal from the signal regenerator 5 is expressed as follows:

$$B_2(t) = A_0 - g(t) \quad (15)$$

By substituting Expression (15) into Expression (9) to (13), the frequency variation $\phi_2(t)$ which is caused in the output signal of the second amplitude limiter 6 owing to the carrier amplitude variation can be obtained as follows:

$$\phi_2(t) = -f \cdot \frac{dg(t + \tau')}{dt} \quad (16)$$

where $\tau'$ is the sum of delay times in the amplitude variation detector 4, the inverter 27 and the signal regenerator 5.

Setting $\tau = \tau'$ by adjusting the delay time in the delay circuit 2, the following expression holds:

$$\phi_1(t) = -\phi_2(t) \quad (17)$$

Therefore, by obtaining the sum of the frequencies of the output signals from the first amplitude limiter 3 and the second amplitude limiter 6 through the use of the frequency sum detector 28, the frequency variations resulting from the carrier amplitude variation can essentially be cancelled. Since the frequency variation of the output signal from the first amplitude limiter 3 consists of the frequency variation of the input wave 1 and the frequency variation caused by the carrier amplitude variation, a signal having substantially the same frequency variation as that of the input wave 1 is provided from the frequency sum detector 28 as a result of the cancellation of the frequency variation arising from the amplitude variation. By using the output signal 8, the angle-modulated input wave 1 can be demodulated substantially free from the influence of the carrier amplitude variation.

Figure 3B:
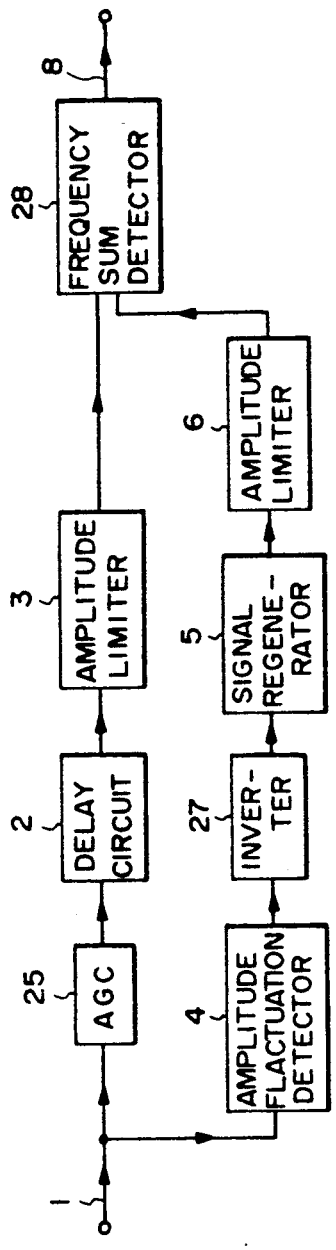
FIGS. 3B and 3C are block diagram showing modified forms of the embodiment depicted in FIG. 3A.

Modified Forms of Third Embodiment (1) While in the circuit arrangement of FIG. 3A the input wave 1 is branched into two after normalization of its mean power by the mean power AGC circuit, it is also possible to connect the mean power AGC circuit only to the path for the signal which is applied to the first amplitude limiter after being branched, as shown in FIG. 3B. Incidentally, the order of the delay circuit 2 and the mean power AGC circuit may also be changed in FIG. 3B.

(2) The same modifications as shown (1), (2) and (4) of the first embodiment can also be employed in the third embodiment.

Figure 3C:
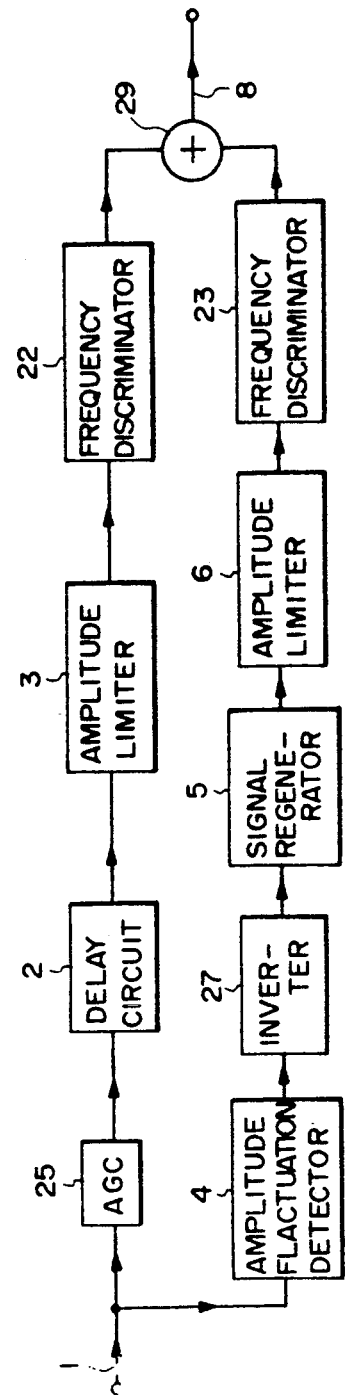

(3) In FIG. 3C there is shown, as a modification of the third embodiment corresponding to the modification (5) of the first embodiment, an arrangement in which the first amplitude limiter 3 and the second amplitude limiter 6 are each immediately followed by a frequency discriminator and the sum of the output signals from the two frequency discriminators are detected. This also permits the removal of noise.

As described above, if demodulating the angle-modulated signal which contains a carrier amplitude variation through the influences of the transmission medium and the characteristic of IF filter in the receiver, there occurs FM noise in the demodulated signal due to AM-FM transformation at a limiter. It is to say that if such a signal is applied intact to an amplitude limiter, noise arising from the amplitude variation is introduced into the signal at the amplitude limiter which converts the carrier amplitude variation into a phase variation. To avoid this, the carrier amplitude variation of the input wave 1 is detected by the amplitude variation detector 4 and a signal which has about the same carrier amplitude variation as that of the input wave 1 is produced by the signal regenerator 5 and is applied to the second amplitude limiter 6 having substantially the same input wave power vs. relative delay time difference characteristic as that of the first amplitude limiter 3, by which about the same frequency variation as that caused by the first amplitude limiter 3 owing to the amplitude variation is introduced into the output signal of the second amplitude limiter 6. Moreover, a frequency difference between the output signals of the first amplitude limiter 3 and the second amplitude limiter 6 is detected by the frequency difference detector 7. Then, the angle-modulates wave can be demodulated almost free from the influence of the carrier amplitude variation of the input wave.

Figure 4:
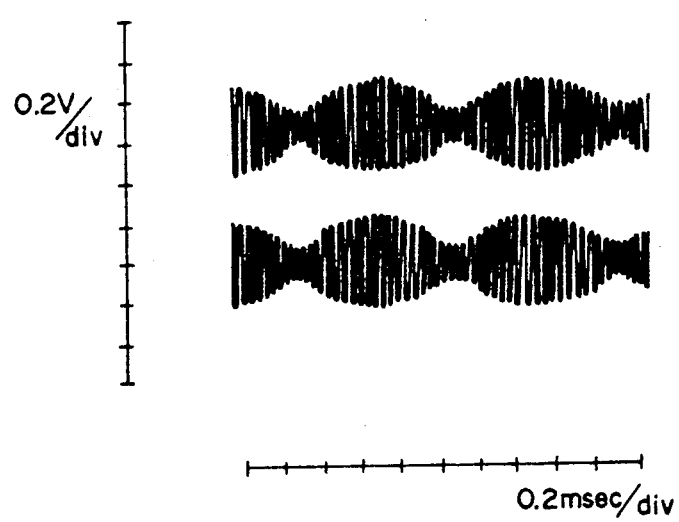
FIG. 4 is a waveform explanatory of the operation of the present invention.
Figure 5B:
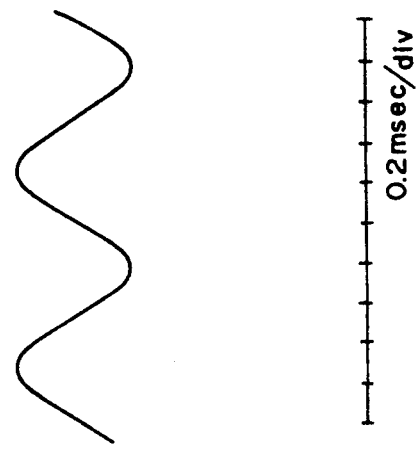
FIGS. 5A and 5B are waveform diagrams showing examples of demodulated signals obtained with a prior art example and this invention device, respectively.
Figure 5D:
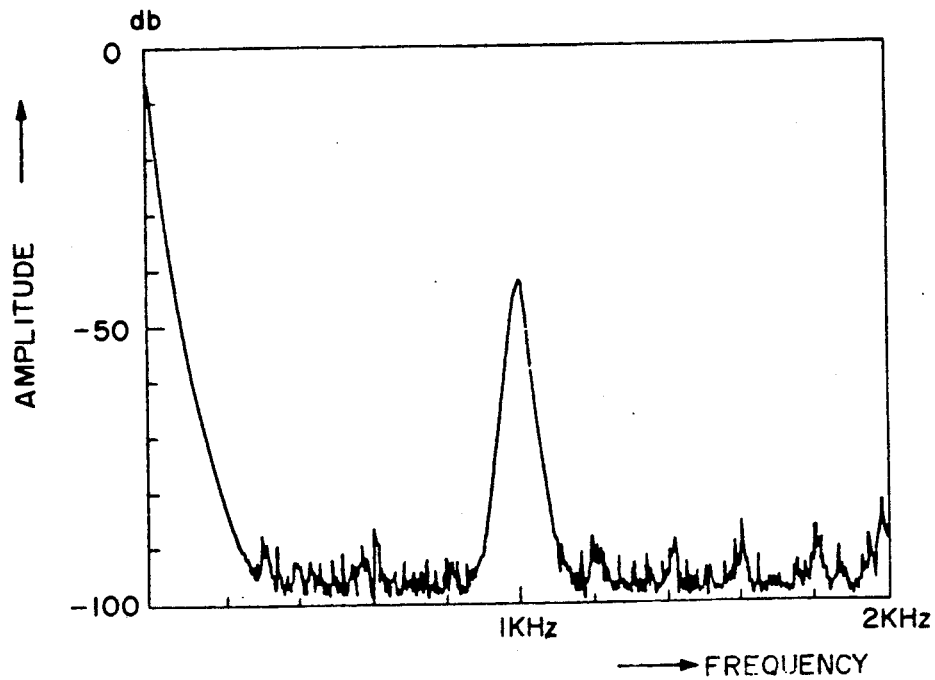
Figure 6B:
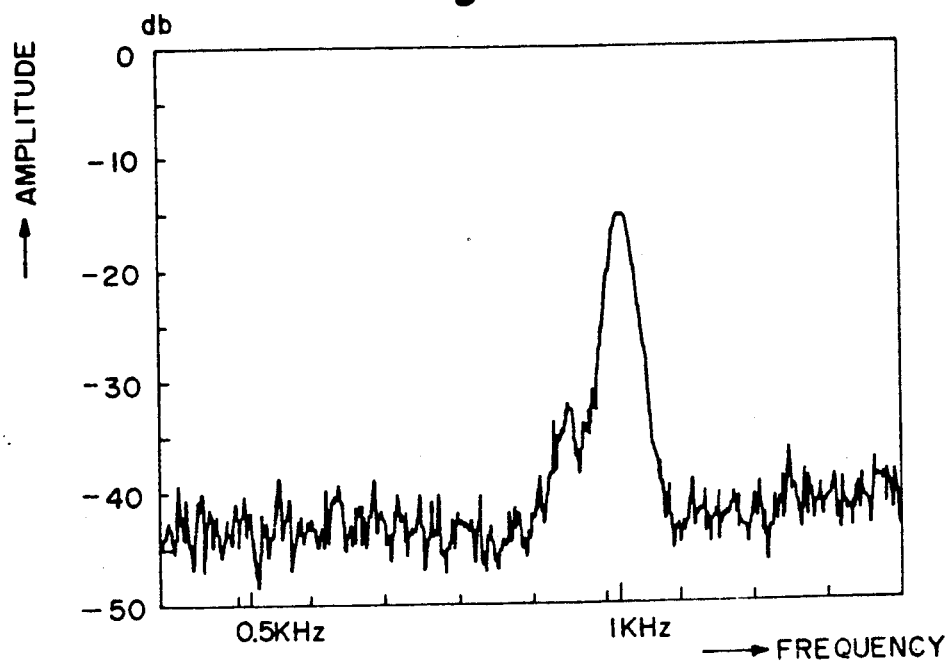

FIG. 4 shows an IF signal (the upper waveform) frequency modulated (modulation index 1) by a 1 kHz sine wave and amplitude modulated (modulator factor 47%) by a 1.2 kHz sine wave. FIG. 4 shows also a signal (the lower waveform) obtained by envelope detecting the above-said signal and amplitude modulating the detected signal. In FIG. 5A there is depicted a demodulated signal obtained when the above-mentioned original signal was provided to a conventional FM receiver, and the spectrum of the demodulated signal is shown in FIG. 5C. In FIG. 5B there is shown a demodulated signal obtained in the case where the above-mentioned signal was applied to the noise eliminating device of the present invention and its output signal was provided to the above-said FM receiver, and the spectrum of the demodulated signal is depicted in FIG. 5D. Comparison of the both indicates that the 1.2 kHz component occurring in the demodulated signal owing to the amplitude variation is suppressed by 30 dB or more. In FIG. 6A there is shown the spectrum of a demodulated signal of an FM signal (1 kHz sine wave signal) whose amplitude varies randomly, and in FIG. 6B there is shown the spectrum of the demodulated signal obtained when the FM signal was applied to the noise eliminating device of the present invention prior to demodulation. The above-mentioned random variation of the amplitude was produced by amplitude modulating the FM signal with the signal obtained by applying to a M-series signal generated at a clock signal rate of 900 bits/sec. to a low-pass filter ($f_c = 2$ kHz). It is seen from comparison to FIGS. 6A and 6B that the noise resulting from the amplitude variation is suppressed as much as 10 to 20 dB even in the case where the amplitude varies randomly. Furthermore, the noise eliminating device of the present invention permits the use of double modulation of AM and FM even if the spectra of their modulation signal overlap since FM noise due to AM can be reversed by the noise eliminating device.

The present invention is very useful for the removal of noise in a case where an angle-modulated wave undergoes an amplitude variation in a radio transmission system such as a satellite communication system.

What I claim is:

1. A noise eliminating device comprising:
   a first amplitude limiter for limiting an angle-modulated input wave to a fixed amplitude;
   an amplitude variation detector for providing an output signal corresponding to the amplitude variation of said input wave;
   a signal regenerator for regenerating from the output signal of said amplitude variation detector an output signal having substantially the same amplitude variation as that of said input wave;
   a second amplitude limiter for limiting the output signal of said signal regenerator to a fixed amplitude; and
   a frequency difference detector which receives each of the output signals of said first amplitude limiter and the second amplitude limiter for producing an output corresponding to the frequency difference between the both output signals in eliminating the influence of an amplitude variation of said angle-modulated input wave.

2. A noise eliminating device according to claim 1, in which said frequency difference detector is connected directly to said first amplitude limiter and said second amplitude limiter.

3. A noise eliminating device according to claim 1, including a frequency discriminator connected between the first amplitude limiter and said frequency difference detector.

4. A noise eliminating device according to claim 1, including a frequency discriminator connected between the second amplitude limiter and said frequency difference detector.

5. A noise eliminating device according to claim 1, including a first frequency discriminator connected between the first amplitude limiter and said frequency difference detector and a second frequency discriminator between the second amplitude limiter and said frequency difference detector.

6. A noise eliminating device comprising:
   an amplitude limiter for limiting an angle-modulated input wave to a fixed amplitude;
   a frequency discriminator for detecting a frequency variation of the output signal from said amplitude limiter;
   an amplitude variation detector for detecting a frequency variation of the output signal from said amplitude limiter;

an amplitude variation detect of for producing an output signal corresponding to the amplitude variation of said input wave; and a signal processing circuit which has information about an input wave power vs. a relative delay time difference of said amplitude limiter, receives the output signals of said frequency discriminator and said amplitude variation detector and produces an output, from said detected frequency variation, of the angle-modulated input wave in eliminating, a frequency variation caused by the amplitude variation.

7. A noise eliminating device comprising:

a mean power AGC circuit for making the means power of a carrier of an angle-modulated input wave to be substantially constant;

a first amplitude limiter for limiting the output signal of said mean power AGC circuit to a fixed amplitude;

an amplitude variation detector which receives said input wave or the output signal of said mean power AGC circuit, for producing an output signal corresponding to its carrier amplitude variation;

an inverter for inverting the sign of the output signal of said amplitude variation detector;

a signal regenerator which receives the output signal of said inverter, for producing an output signal which has substantially the same means power as that of the output signal of said mean power AGC circuit and has amplitude variation reverse of that of the input wave;

a second amplitude limiter for limiting the output signal of said signal generator to a fixed amplitude; and a frequency sum detector which receives the output signals of said first amplitude limiter and of said second amplitude limiter for producing a signal corresponding to the sum of the frequencies of the both output signals for producing an output of the angle-modulated input wave in eliminating the influence of an amplitude variation of said angle-modulated input wave.

8. A noise eliminating device according to claim 7, in which said frequency sum detector is connected directly to said first amplitude limiter and said second amplitude limiter.

9. A noise eliminating device according to claim 7, including a frequency discriminator connected between the first amplitude limiter and said frequency sum detector.

10. A noise eliminating device according to claim 7, including a frequency discriminator connected between the second amplitude limiter and said frequency sum detector.

11. A noise eliminating device according to claim 7, including a first frequency discriminator connected between the first amplitude limiter and said frequency sum detector and a second frequency discriminator between the second amplitude limiter and said frequency sum detector.

* * * * *